United States Patent [19]

Chanen et al.

[11] Patent Number: 5,068,114

[45] Date of Patent: Nov. 26, 1991

[54] ANIMAL FEED BLOCK COMPOSITION

[75] Inventors: Michael J. Chanen, St. Louis Park; Robert W. Roskowiak, St. Paul, both of Minn.

[73] Assignee: Cargill, Incorporated, Minneapolis, Minn.

[21] Appl. No.: 446,997

[22] Filed: Dec. 6, 1989

[51] Int. Cl.$^5$ .............................................. A23K 1/22
[52] U.S. Cl. ..................................... 426/69; 426/72; 426/74; 426/601; 426/623; 426/634; 426/658; 426/807
[58] Field of Search .................... 426/634, 69, 72, 74, 426/623, 630, 635, 807, 658, 601

[56] References Cited

U.S. PATENT DOCUMENTS

| 3,420,672 | 1/1969 | Appleman | 426/69 |
| 4,027,043 | 5/1977 | Schroeder et al. | 426/74 |
| 4,160,041 | 7/1979 | Schroeder et al. | |
| 4,431,675 | 2/1984 | Schroeder et al. | |
| 4,798,727 | 1/1989 | Miller | 426/74 |
| 4,800,092 | 1/1989 | Miller | 426/74 |

FOREIGN PATENT DOCUMENTS 1555008 10/1976 United Kingdom .

Primary Examiner—R. B. Penland
Attorney, Agent, or Firm—Fitch, Even, Tabin & Flannery

[57] ABSTRACT

Compositions and method for forming a weather resistant, non-flowable and stackable animal feed block from flowable premixes. A first premix comprises particular cane molasses, dissolved calcium chloride, fat, water, and urea having a pH between about 4.4 and about 5.5. A second premix comprises water soluble salts of orthophosphoric acid which when mixed with the first premix provides a block having a hardness of 4.0 in 6 hours or less and minimum loss in field weather conditions. A dry blend of animal feed supplements may be included in the block.

24 Claims, No Drawings

ANIMAL FEED BLOCK COMPOSITION

BACKGROUND OF THE INVENTION

1. Field of the Invention

This invention relates generally to a weather resistant, non-flowable, and stackable animal feed block and, more particularly, it relates to such a block which provides an animal feed supplement for controlled intake.

2. Brief Description of the Prior Art

The prior art discloses the preparation of animal feed supplements including molasses, with the addition of phosphoric acid to serve as a preservative and as a source of dietary phosphorus, and urea has been added to supply non-protein nitrogen. Fats have been included in these feed supplements. However, most of these supplements, in earlier days, have been in liquid form and were utilized by mixing into animal feed rather than permitting free-choice feeding by animals.

In addition, the prior art discloses blocks to provide controlled intake and supply dietary requirements to animals, such as salt blocks, mineral blocks, protein blocks and molasses blocks.

Also, U.S. Pat. No. 3,420,672 discloses the formation of a stable emulsion of animal fats in molasses containing feed supplements, but requires a starch emulsifying agent. The starch is present in relatively large quantities and such quantities are desirably avoided.

U.S. Pat. No. 4,027,043 discloses an animal feed supplement which contains a major portion of molasses and various solidifying components like phosphate or phosphoric acid and a metal oxide or salt in sufficient quantities and proportions to solidify the product. This patent also discloses the presence of an edible fat or oil along with a fat emulsifying agent to prevent separation of the fat or oil from the solid composition.

U.S. Pat. No. 4,798,727 discloses an acidic feed supplement block which is formed from the reaction of an acidic liquid mixture comprising (a) a sugar-containing source, such as molasses, (b) an orthophosphate source or precursor, (c) magnesium, and (d) sufficient calcium to provide total calcium to magnesium weight ratio of between about 1.5 and 3. The method results in the formation of a liquid molasses mixture having an acidic pH prepared by mixing two solutions, at least one of which contains molasses, and an orthophosphate compound with a second solution comprising sufficient calcium to react with the phosphate in the presence of magnesium so as to form a solid block. However, this block requires substantial hardening times.

U.S. Pat. No. 4,800,092 discloses two methods for providing the composition of the U.S. Pat. No. 4,798,727.

The prior art, however, has not provided animal feed supplement blocks with the best weatherability, nor the provision of two distinct fluid phases which are stable over substantial periods of time, but which, when mixed together, provide a high degree of hardness in a short period of time. More particularly, the prior art has provided blocks which erode under weather conditions found in the field resulting in loss of valuable supplements and has not provided for the formation of stackable hard blocks in short periods of time, such as about 6 hours or less. In addition, the prior art blocks did not provide stackability but tended to slump when stacked thereby interfering with storage and shipment of the block.

OBJECTS OF THE INVENTION

It is a principal object of this invention to provide an improved composition and method for forming an animal feed block which has high weatherability and which is capable of rapid development of hardness by mixing of two liquid phases or premixes.

It is a further object of the invention to provide a two-phase block formation system, each of the phases being flowable and maintaining flowability over a substantial period of time for shipment and distribution.

A still further object of the invention is the provision of a composition and method which will provide a block having a hardness within 6 hours or less to permit stacking and which can incorporate additional supplemental material for animal nutrition.

Still further objects and advantages of the invention will become apparent by reference to the following description and examples.

BRIEF STATEMENT OF THE INVENTION

This invention is directed to the provision of a weatherable and stackable animal feed block which is formed to a hardness in excess of 4.0 within 6 hours and which comprises two phases or premixes which remain flowable over extended periods of time. One phase comprises a particular cane molasses in an amount from about 65 percent to about 80 percent. Not all cane molasses provide the desired results of the invention and it has been found that the cane molasses utilized should not increase in viscosity more than 3½ times over a 24 hours period upon the addition of dissolved calcium chloride, the calcium chloride being added at a level of 3.84 percent (dry basis) to the molasses. Beet molasses and certain cane molasses do not provide the results of the invention because the viscosity excessively increases upon the addition of the dissolved calcium chloride thereby impairing flowability.

The composition further includes in the first phase calcium chloride at a level on a dry basis of between about 3.0 percent and about 4.5 percent in dissolved form. Other divalent cations such as magnesium should not be used in the first phase.

Sufficient water should be present in the first phase to dissolve the calcium chloride. In this connection the calcium chloride may be initially dissolved in water or the water can be added to the molasses before addition of calcium chloride. The water in phase one should be at a level of between about 5.75 percent and about 8 percent.

The first phase further requires from about 3.3 percent to about 7.0 percent of a fat to provide weatherability to the block. It is not desired to provide any emulsifying agent with the fat and the fat can be a soft oil or hard fat, as desired. Lower levels of fat do not provide the weatherability desired and high levels of fat will produce unacceptable high viscosities.

In order to maintain flowability of the first phase, between about 4.9 percent and about 8.5 percent of urea prills is added which serves to maintain the fluidity of the first phase over extended periods. While urea provides a source of non-protein nitrogen for the animal feed block, it is primarily added to the first phase to maintain fluidity and avoid crystal formation and undue viscosity increase. Absent the presence of the urea, the first phase will set up and become unsatisfactory for purposes of the invention.

The first phase should have a pH in the range of from about 4.4 to about 5.5.

The invention further contemplates a second flowable phase or premix which includes from about 47.75 percent to about 52.25 percent of orthophosphoric acid at a concentration in excess of 75 percent, and from about 47.75 percent to about 52.25 percent of sodium hydroxide at a concentration in excess of about 40 percent to form a sodium phosphate solution. The ratio of sodium (Na) to phosphorous (P) should be in the range between 0.90:1 and 1.25:1. It is important that the sodium hydroxide be added to the orthophosphoric acid in such dilution and rate so as to avoid the formation of trisodium phosphate which is insoluble. It has been found that for purposes of the invention the polyphosphates such as sodium hexameta-phosphate, sodium tripolyphosphate, ammonium polyphosphate and others will not work to provide the desired results. As indicated, the presence of insoluble trisodium phosphate also avoids the enjoyment of the results of this invention.

This second phase should have a pH from about 5.0 to about 6.2.

The two liquid phases or pre-mixes are mixed together, when desired, as by a manufacturer, or by a producer at a feedlot. The convenience of transport and shipment of the two phases avoids the need for preformation of blocks and certain difficulties in their handling. The mixture of the two phases should include between about 46 percent and about 75 percent of phase one and between about 11 percent and about 25 percent of phase two. Upon mixing, the resulting composition should have a pH of between about 4.0 and about 6.0, and preferably has a pH of about 5.0. The ratio of dissolved calcium (Ca) to phosphorous (P) should be in the range of from about 0.26:1 to about 0.32:1.

The combination of phases should provide a block hardness of at least 4.0 in 6 hours or less. The resulting hard block provides for controlled feeding and stacking of many blocks on one another. The blocks of the invention have high weatherability and low weather erosion. The hardness of the blocks provides good storage and shipment features.

In order to provide a desired nutrition for animals, a dry mix can be educted into the mixture of phase one and phase two before hardening, and additional supplements can be added such as vitamins, urea, limestone, selenium, protein rich meals and mineral mixtures. The limestone should be substantially insoluble in the mix so as to avoid addition of calcium (Ca) in ionic form to the block-forming ingredients. Likewise, magnesium oxide or other form of magnesium (Mg) may be added for nutritional purposes, but it should be substantially insoluble in the two phases of the animal feed and should not contribute magnesium in ionic form to the block.

If soybean meal or other protein rich meals containing phosphate are provided in the dry mix, lesser amounts of orthophosphoric acid may be utilized in the second phase.

Some of the supplements, such as vitamins and selenium may be added to phase one, i.e. other than in the dry blend.

Basically, the two phases when reacted provide a carrier for the dry ingredients, if used, although soluble phosphates in the meals may provide a source of phosphate ion in addition to that provided by phase two.

The invention is most enjoyed by obtaining a hardness of 4.0 within six hours. The hardness is determined in accordance with the following method and use of the indicated equipment:

Ametek Force gauge (Model T-10P) is forced one inch into the gel. The hardness is measured as the force necessary to insert probe one inch.

Weatherability of the hard block is determined by forming a block in accordance with this invention, weighing the block, and then spraying the block with water over a period of 10 minutes (150 ml/minute flow rate). The loss of weight during the spraying period is a measure of the weatherability of the block.

In general, in accordance with the method of the invention, phase one is prepared by dissolving calcium chloride in water and/or sufficiently diluted cane molasses. However, total solids content of the calcium chloride, urea and molasses solids should not exceed 68 percent to avoid substantial increases in viscosity or crystallization of the cane molasses.

Urea is added into the mixture of molasses and dissolved calcium chloride and, as indicated, the presence of the urea in solubilized form serves to maintain the flowability of phase one for extended periods of time. The fat is then added to the mixture and the fat may be a soft oil such as soybean oil or may be a hard fat such as tallow. The fat is necessary to provide the weatherability of the block and, while it serves as an energy source for the food supplement, it is primarily present to provide protection against the elements in the field. After mixing in of the fat, the remaining cane molasses is added to complete the basic formulation of phase one. Various nutrients may be mixed into phase one ingredients provided they do not significantly effect an increase in viscosity or crystallization. After the ingredients are mixed, they may be placed in a suitable container for shipment. It has been found that the phase one ingredients can be held as long as 3 months without losing flowability or substantially increasing in viscosity. Thus, it remains readily mixable with phase two.

Phase two is formed by placing the concentrated orthophosphoric acid into a container or kettle and is slowly neutralized by the addition of diluted sodium hydroxide, the rate being adjusted so as to avoid the formation of trisodium phosphate, an insoluble compound. The sodium hydroxide is desirably diluted to about 47-55 percent, and is preferably a 50 percent solution. This results in the formation of a flowable sodium phosphate solution, which can be placed into a container and held for shipment over extended periods of time and it has been found that the second phase can be held for shipment for as long as 3 months.

Various ingredients can be blended together to provide a dry blend for addition into the feed block to provide additional supplemental materials for animals. A particularly desired supplement is soybean meal but other protein rich meals can be included. Meals can be derived from various sources. The dry blend can include cracked corn and other cracked seed. Various additional minerals, selenium and vitamins may be included, and further non-protein nitrogen can be added by further addition of urea prills.

It is possible to dilute the cane molasses with other nutritive liquids with lower solids relative to cane molasses, such as corn distiller solubles, other molasses, potale, brewer's condensed solubles, and stick water, but these nutritive liquids should not comprise more than about 15 percent of the amount of nutritive liquids used, or a level such that block solids fall below 70 percent. The stick water can serve to provide both fat and protein.

To form the block when the dry ingredients are added, the first phase and second phase are mixed together, and the blended dry ingredients are educted into the mixture. The final blend is discharged into a form of desired shape to provide the blocks of the invention.

If magnesium is desired in the blocks for nutritional purposes, it should be introduced in insoluble form and generally will be introduced as prilled magnesium oxide. The magnesium, if in ionic form tends to interfere with gelation of the blocks of the invention and, therefore, should not be dissolved in the block. In other words, the magnesium does not contribute to the gelation or hardening of the block in accord with what we have found.

The invention will be more particularly understood by reference to the following Examples:

EXAMPLE 1

In order to form a first flowable premix, the following ingredients were blended together:

| Ingredient | Based on Final Block | Based on First Premix |
|---|---|---|
| 84 Brix cane molasses | 36.43% | 79.21% |
| Calcium chloride | 1.84% | 4.00% |
| Water | 2.66% | 5.79% |
| Prilled urea | 2.25% | 4.90% |
| Animal fat | 2.81% | 6.10% |

The calcium (Ca) is present at 1.12 percent based on the first premix. Minerals and vitamins were included in the first premix and were as follows:

| | Based on Final Block |
|---|---|
| Selenium | .110% |
| Mineral mix | .100% |
| Vitamins, A, D, E | .022% |

However, these additives may be included with the dry mix, if desired.

The pH of the first premix was 4.96.

A second flowable premix was prepared comprising the following:

| | Based on Final Block | Based on Second Premix |
|---|---|---|
| Phosphoric acid (85%) | 6.68% | 47.76% |
| Sodium hydroxide (50%) | 7.32% | 52.24% |

The percent phosphorous (P) in the second premix is 12.6 percent based on the second premix.

The pH of the second premix was 6.15.

The ratio of calcium to phosphorous was about 0.29:1 when the premixes were combined. The pH of the combined premixes was 5.1.

A dry blend was prepared by blending together the following ingredients in the indicated percentages:

| | Based on Final Block | Based on Dry Blend |
|---|---|---|
| Ground corn | 8.37% | 20.92% |
| Limestone (CaCO$_3$) | 8.50% | 21.25% |
| Corn gluten meal | 18.0% | 45.00% |
| Prilled magnesium oxide | 3.2% | 8.00% |
| Prilled urea | 1.93% | 4.83% |

To form the first flowable premix, 15% of the molasses to be used was diluted with the 5.79% water and the 4.0% calcium chloride was mixed in until dissolved. After dissolving of the calcium chloride, the 4.9% of urea prills were added and mixed until dissolved, whereupon tallow in the amount of 6.10% was added and mixed into the flowable mixture. The remainder of the cane molasses was added.

The cane molasses was obtained from Florida and had a viscosity of 5740 cps. After addition of dissolved calcium chloride at a level of 3.84 percent based on molasses, and mixing with the cane molasses, the viscosity increased over 24 hours to 19860 cps or an increase 3.46 times the initial viscosity. This was quite acceptable for use in the first premix and maintaining its flowability for a three month period.

To form the second flowable premix, the orthophosphoric acid (85%) was placed in a kettle and the sodium hydroxide (50%) was slowly added to avoid formation of trisodium phosphate. After formation of the sodium phosphate solution, it was poured into a container for shipment and later use. The ratio of sodium to phosphorous in the second premix was 1:25:1.

The ratio of calcium (Ca) in the first premix to phosphorous (P) in the second premix was 0.29:1.

Each of the premixes when stored under ambient conditions remained flowable after three months and were readily mixable.

To prepare blocks, a mixture of 46.00% of premix one, 14.0% of premix two and 40.00% of the dry blend were combined by mixing premix one and premix two together and educting the dry blend into the premises In six hours, the blocks had a hardness of 4.0 and were stackable for extended periods of time without slumping.

The blocks when tested for weight loss by the method previously described lost 1.95 percent of initial

EXAMPLE 2

In order to form a first flowable premix, the following ingredients were blended together:

| Ingredient | Based on Final Block | Based on First Premix |
|---|---|---|
| 84 Brix cane molasses | 42.57% | 74.70% |
| Calcium chloride | 2.45% | 4.30% |
| Water | 4.42% | 7.75% |
| Prilled urea | 4.70% | 8.25% |
| Animal fat | 2.85% | 5.00% |

The calcium (Ca) is present at 1.20 percent based on the first premix.

Minerals and vitamins were included in the first premix and were as follows:

| | Based on Final Block |
|---|---|
| Selenium | .110% |
| Mineral mix | .100% |

-continued

|  | Based on Final Block |
| --- | --- |
| Vitamins, A, D, E | .022% |

However, these additives may be included with the dry mix, if desired. The pH of the first premix was 5.10.

A second flowable premix was prepared comprising the following:

|  | Based on Final Block | Based on Second Premix |
| --- | --- | --- |
| Phosphoric acid (75%) | 9.16% | 50.89% |
| Sodium hydroxide (50%) | 8.84% | 49.11% |

The percent phosphorous (P) in the second premix is 12.06 percent based on the second premix.

The pH of the second premix was 5.95.

The ratio of calcium to phosphorous was about 0.316:1 when the premixes were combined. The pH of the combined premixes was 5.00.

A dry blend was prepared by blending together the following ingredients in the indicated percentages.

|  | Based on Final Block | Based on Dry Blend |
| --- | --- | --- |
| Soybean meal | 21.5% | 86.00% |
| Limestone (CaCO$_3$) | 3.5% | 14.00% |

To form the first flowable premix, 5.75% water and 4.30% calcium chloride were combined. After dissolving of the calcium chloride, 8.15% of urea prills were added and mixed until dissolved, whereupon tallow in the amount of 5.0% was added and mixed into the flowable mixture. The remainder of the high Brix cane molasses was added.

The cane molasses was obtained from Australia/Mexico and had a viscosity of 10,150 cps. After addition of calcium chloride and mixing with the cane molasses, the viscosity increased over 24 hours to 31,800 cps or an increase 3.13 times the initial viscosity. This source is quite acceptable for use in the first premix.

To form the second flowable premix, the orthophosphoric acid (75%) was placed in a kettle and the sodium hydroxide (50%) was slowly added to avoic formation of trisodium phosphate. After formation of the sodium phosphate solution, it was poured into a container for shipment and later use. The ratio of sodium to phosphate in the second premix was 0.51:1.

The ratio of calcium (Ca) in the first premix to phosphorus (P) in the second premix Was 0.316:1.

Each of the premixes when stored under ambient conditions remained flowable after three months and were readily mixable.

To prepare blocks, a mixture of 57.00% of premix one, 18.0% of premix two and 25.00% of the dry blend were combined by mixing premix one and premix two together and educting the dry blend into the premixes. In six hours, the blocks had a hardness of 4.0 and were stackable for extended periods of time without slumping.

The blocks when tested for weight loss by the method previously described lost 2.69% of initial weight.

EXAMPLE 3

To determine the effect of different molasses in the formation of blocks of the invention, the following molasses were tested to determine viscosity increases in 24 hours by addition of calcium chloride at a level of 3.8% (dry basis) based on weight of molasses.

|  | Brix | Viscosity (cps) | 24 Hr. Viscosity | Increase |
| --- | --- | --- | --- | --- |
| Cane Molasses |  |  |  |  |
| Florida | 84.0 | 5,740 | 19,820 | 3.46 |
| Hawaii | 84.0 | 11,250 | 36,860 | 3.30 |
| Mexico | 84.0 | 10,800 | 32,400 | 3.00 |
| Australia/ Mexico | 84.0 | 10,150 | 31,800 | 3.13 |
| Thailand | 84.0 | 3,520 | 19,000 | 5.40 |
| Beet Molasses | 84.0 | 11,650 | 94,200 | 8.09 |

The use of Thailand cane sugar molasses and beet molasses were unacceptable for the first premix and desired block formation. Accordingly, the experience shows that the viscosity should not have an increase in excess of about 3.5 times.

EXAMPLE 4

To demonstrate the effect of using phosphates other than soluble orthophosphates, various polyphosphates were substituted at comparable phosphorous levels to show gel rates, i.e. hardness after 6 hours.

| Phosphate Source | 6 Hour Hardness |
| --- | --- |
| Example 2 Block | 4.4 |
| Sodium Hexametaphosphate | 0.3 |
| Sodium Tripolyphosphate | 0.0 |
| Ammonium Polyphosphate | 1.2 |

EXAMPLE 5

For purposes of comparing the effect of polyvalent cations other than calcium in the block, magnesium and aluminum ions were substituted f-r calcium ions in the formulation at equal molar levels and block hardness after twenty four hours was determined with the following results:

| Cation | 24 Hour Hardness |
| --- | --- |
| Magnesium | 0.0 |
| Aluminum | 0.5 |
| Calcium | 5.6 |

EXAMPLE 6

The effect of pH on block hardness is indicated below by measuring pH at the time of mixing the first premix and second premix and determining hardness after 24 hours.

| pH | 6 Hour Hardness | 24 Hour Hardness |
| --- | --- | --- |
| 3.0 | -0- | 0.3 |
| 3.5 | 1.4 | 2.4 |
| 4.0 | 4.3 | 5.2 |
| 4.5 | 4.2 | 5.8 |
| 5.0 | 4.4 | 7.2 |
| 5.5 | 4.0 | 6.8 |
| 6.0 | 4.0 | 5.7 |
| 6.5 | 1.8 | 3.0 |

| -continued | | |
|---|---|---|
| pH | 6 Hour Hardness | 24 Hour Hardness |
| 7.0 | 0.5 | 1.4 |

The pH was adjusted with phosphoric acid or sodium hydroxide to achieve the desired pH level.

The 24 hour hardness of 5.4 is equivalent to a 6 hour hardness of 4.0. However, a hardness of less than about 5.4 after 24 hours does not provide the necessary hardness for stacking and shipping purposes.

It has been found that an improved animal feed block having high weatherability and stackability can be provided in a short period of time by careful selection of certain parameters which have not been previously set forth. The block is derived from two phases which remain flowable over extended time periods and can be separately provided to permit formation of blocks when needed.

The various features of the invention on which are believed to be new are set forth in the following Claims:

What is claimed is:

1. A two part composition for forming a weather resistant, stackable animal feed block upon mixing of the parts, the composition comprising a first flowable premix including from about 65% to about 80% of cane molasses, from about 3.0% to about 4.5% of dissolved calcium chloride, from about 3.3% to about 7.0% fat, from about 5.75% to about 8% water, and from about 4.9% to about 8.5% urea prills, said first premix having a pH from about 4.4 to about 5.5, the first premix substantially free of divalent cations other than $Ca^{2+}$ ions and not increasing in viscosity more than about $3\frac{1}{2}$ times with the mixture of $CaCl_2$ therein; and a second liquid premix containing water soluble salts of orthophosphoric acid, said second premix having a pH from about 5.0 to about 6.2, the first and second premixes when combined having a pH between about 4.0 and about 6.0, wherein the ratio of the first premix to the second premix is in the range of from about 1.84:1 to about 6.82:1, the ratio of dissolved calcium in the first premix to dissolved phosphorous in the second premix is in the range of between about 0.26:1 and about 0.32:1 and forming the weather resistant, stackable animal feed block upon mixing, which block has a hardness of more than about 4 in about 6 hours.

2. The composition of claim 1 comprising the combination of the first premix and the second premix, wherein the ratio of the first premix to second premix is in the range of from about 3.0:1 to about 3.5:1.

3. The composition of claim 2 wherein the water soluble salts of the second premix are formed from sodium hydroxide and phosphoric acid at concentrations which avoid the formation of trisodium phosphate when the sodium hydroxide and phosphoric acid are mixed.

4. The composition of claim 3 wherein the ratio of sodium to phosphorous in the second premix is in the range of 0.9:1 to 1.25:1.

5. The composition of claim 1 wherein the composition further includes a blend of dry ingredients of animal feed supplements in the first or second premix.

6. The composition of claim 1 wherein the water soluble salts of the second premix are formed from sodium hydroxide and phosphoric acid at concentrations which avoid the formation of trisodium phosphate when the sodium hydroxide and phosphoric acid are mixed.

7. The composition of claim 6 wherein the ratio of sodium to phosphorous in the second premix is in the range of about 0.9:1 to about 1.25:1.

8. The composition of claim 1 comprising the combination of the first premix and the second premix, wherein the ratio of the first premix to second premix is in the range of from about 3.0:1 to about 3.5:1.

9. In a method for forming a weather resistant, non-flowable, and stackable animal feed block consisting essentially of preparing a flowable first premix by dissolving from about 3% to about 4.5% of calcium chloride in about 5.75% to about 8% of water and between about 0% to about 20% of cane molasses to form an aqueous calcium chloride solution, mixing between about 4.9% and about 8.5% urea prills with the calcium chloride solution to form an aqueous calcium chloride urea blend such that the premix does not increase in viscosity more than $3\frac{1}{2}$ times, mixing between about 3.3% and about 7.0% fat with the aqueous calcium chloride urea blend to form an aqueous fat blend, and mixing can molasses with the aqueous fat blend to make up 100 percent of the premix, the first premix when mixed with a second flowable premix comprising water soluble salts of orthophosphoric acid, said mixture having a pH between about 4.0 and about 6.0 wherein the ratio of the first premix to the second premix is in the range of from about 1.84:1 to about 6.82:1, the ratio of dissolved calcium in the first premix to dissolved phosphorous in the second premix is in the range of between about 0.26:1 and about 0.32:1, and said block has a hardness in excess of 4 in 6 hours.

10. The method of claim 9 which further comprises preparing a second flowable premix by mixing sodium hydroxide and orthophosphoric acid at concentrations and at such rate as to avoid formation of insoluble phosphates, the second premix comprising from about 47.75 to about 52.25 percent orthophosphoric acid and from about 47.75% to about 52.25% sodium hydroxide.

11. The method of claim 10 further comprising mixing the first premix and the second premix to provide a block having a hardness in excess of 4.0 in 6 hours.

12. The method of claim 10 which further comprises mixing a blend of dry ingredients of animal feed supplements to the premix or the second premix.

13. The method claim 10 wherein the first premix is substantially free of solubilized divalent cations other than the $Ca^{2+}$.

14. The method of claim 10 wherein the total solids content of the $CaCl_2$, urea and molasses is not greater than about 68%.

15. The method of claim 9 wherein the first premix is substantially free of solubilized divalent cations other than the $Ca^{2+}$.

16. A three part composition for forming a weather resistant, stackable animal feed block upon mixing of the parts, the composition consisting essentially of a first flowable premix, a second liquid premix and a dry blend, the first flowable premix comprising from about 65% to about 80% of cane molasses, from about 3.0% to about 4.5% of dissolved calcium chloride, from about 3.3% to about 7.0% fat, from about 5.75% to about 8% water, and from about 4.9% to about 8.5% urea prills, said first premix having a pH from about 4.4 to about 5.5, the first premix substantially free of divalent cations other than $Ca^{2+}$ ions and not increasing in viscosity more than about $3\frac{1}{2}$ times with the mixture of $CaCl_2$ therein; the second liquid premix containing water soluble salts of orthophosphoric acid, said second premix having a pH from about 5.0 to about 6.2, wherein the ratio of the first premix to the second premix is in the range of from about 1.84:1 to about 6.82:1, the ratio of dissolved calcium in the first premix to dissolved phosphorous in the second premix is in the range of between about 0.26:1 and about 0.32:1, the dry blend comprising salts of divalent cations which salts are substantially insoluble in water, the first and second premixes and dry blend when combined having a pH between about 4.0 and about 6.0 and forming the weather resistant, stackable animal feed block upon mixing, which block has a hardness of more than about 4 in about 6 hours.

17. The composition of claim 16 wherein the water soluble salts of the second premix are formed from sodium hydroxide and phosphoric acid at concentrations which avoid the formation of trisodium phosphate when the sodium hydroxide and phosphoric acid are mixed.

18. The composition of claim 17 wherein the ratio of sodium to phosphorous in the second premix is in the range of 0.9:1 to 1.25:1.

19. The composition of claim 16 wherein the water soluble salts of the second premix are formed from sodium hydroxide and phosphoric acid at concentrations which avoid the formation of trisodium phosphate when the sodium hydroxide and phosphoric acid are mixed.

20. The composition of claim 19 wherein the ratio of sodium to phosphorous in the second premix is in the range of about 0.9:1 to about 1.25:1.

21. The composition of claim 16 wherein the combination of the first premix and the second premix is in the range of from about 3.0:1 to about 3.5:1.

22. In a method for forming a weather resistant, non-flowable, and stackable animal feed block comprising preparing a flowable first premix by dissolving from about 3% to about 4.5% of calcium chloride in about 5.75% to about 8% of water and between about 0% to about 20% of cane molasses to form an aqueous calcium chloride solution, mixing between about 4.9% and about 8.5% urea prills with the calcium chloride solution to form an aqueous calcium chloride urea blend such that the premix does not increase in viscosity more than 3¼ times, mixing between about 3.3% and about 7.0% fat with the aqueous calcium chloride urea blend to form an aqueous fat blend, mixing cane molasses with the aqueous fat blend to make up 100 percent of the first premix, preparing a second flowable premix by mixing sodium hydroxide and orthophosphoric acid at concentrations and at such rate as to avoid formation of insoluble phosphates, the second premix comprising from about 47.75 to about 52.25 percent orthophosphoric acid at a concentration of at least about 75% and from about 47.75% to about 52.25% aqueous sodium hydroxide at a concentration of at least about 40%, mixing a dry blend with the first premix, second premix or a mixture of the first and second premixes, the first premix, the second flowable premix and dry blend when mixed together having a ratio of dissolved calcium to dissolved phosphorous of from about 0.26:1 to about 0.32:1, a pH between about 4.0 and about 6.0, wherein the ratio of the first premix to the second premix is in the range of from about 1.84:1 to about 6.82:1, and the block has a hardness of more than about 4 in about 6 hours.

23. The method of claim 22 wherein the first premix is substantially free of solubilized divalent cations other than the $CaCl_2$.

24. The method of claim 22 wherein the total solids content of the $CaCl_2$, urea and molasses is not greater than about 68%.

* * * * *

UNITED STATES PATENT AND TRADEMARK OFFICE
CERTIFICATE OF CORRECTION

PATENT NO. : 5,068,114
DATED : November 26, 1991
INVENTOR(S) : Chanen et al.

It is certified that error appears in the above-identified patent and that said Letters Patent is hereby corrected as shown below:

Title page:

[75] Inventors: change "Robert W. Roskowiak" to --Robert M. Roskowiak--.

Column 6, line 45, after "initial" insert --weight.--.
Column 7, line 49, change "avoic" to --avoid--.
Column 7, line 55, change "Was" to --was--.
Column 8, line 43, change "f-r" to --for--.

Claim 9, column 10, line 23, change "can" to --cane--.

Signed and Sealed this

Twenty-third Day of March, 1993

Attest:

STEPHEN G. KUNIN

Attesting Officer

Acting Commissioner of Patents and Trademarks